United States Patent [19]

Imoto et al.

[11] Patent Number: 4,790,614
[45] Date of Patent: Dec. 13, 1988

[54] OPTICAL FILTER AND OPTICAL DEVICE USING SAME

[75] Inventors: Katsuyuki Imoto, Sayama; Hirohisa Sano, Kokubunji; Minoru Maeda, Nishitama, all of Japan

[73] Assignee: Hitachi, Ltd., Tokyo, Japan

[21] Appl. No.: 929,911

[22] Filed: Nov. 13, 1986

[30] Foreign Application Priority Data

Nov. 21, 1985 [JP] Japan .................. 60-259760
Jan. 8, 1986 [JP] Japan ..................... 61-540
May 28, 1986 [JP] Japan ................. 61-121010

[51] Int. Cl.$^4$ .............................................. G02B 6/10
[52] U.S. Cl. .............................................. 350/96.12
[58] Field of Search ............... 350/96.11, 96.12, 96.18; 156/643, 646

[56] References Cited

U.S. PATENT DOCUMENTS 3,970,360 7/1976 Kersten et al. ............... 350/96.12 X
4,141,621 2/1979 Aagard et al. ................... 350/96.12
4,693,544 9/1987 Yamasaki et al. ............. 350/96.12 X

FOREIGN PATENT DOCUMENTS 0135906 7/1985 Japan .................. 350/96.11

Primary Examiner—Eugene R. LaRoche
Assistant Examiner—Steven J. Mottola
Attorney, Agent, or Firm—Antonelli, Terry & Wands

[57] ABSTRACT

An optical filter is formed by providing a plurality of gaps, which have a desired width and such a depth that is larger than the thickness of the waveguide layer, in a slab or a waveguide layer in a three-dimensional optical waveguide so as to extend in the light propagating direction at desired period intervals. These gaps are filled with a film of a material, the refractive index of which is different from that of the waveguide layer, to complete the optical filter. A multiplex wavelength transmission device is formed monolithically by providing at least one optical filter, which is formed in the above-mentioned manner, in an optical waveguide, and arranging one or both of a light-emitting semiconductor element and a photodetector on the side of an optical signal which has passed through the optical filter, and on the side of an optical signal which has been reflected on the same optical filter.

17 Claims, 24 Drawing Sheets

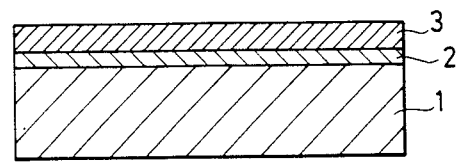
FIG. 4A
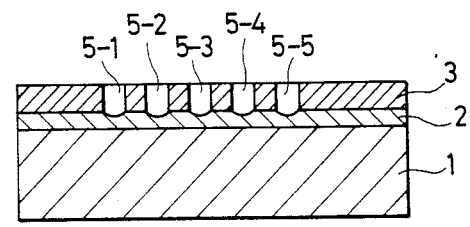
FIG. 4B
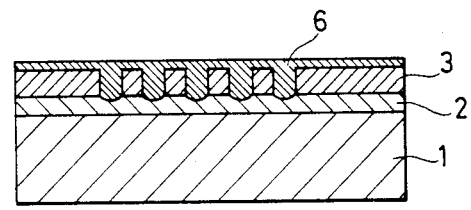
FIG. 4C
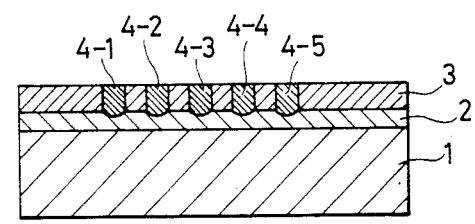
FIG. 4D
FIG. 5A
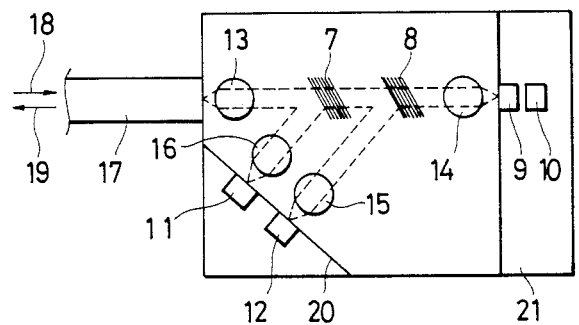
FIG. 5B
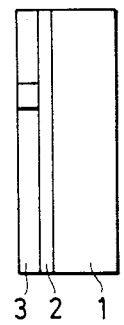

FIG. 6B
FIG. 6A
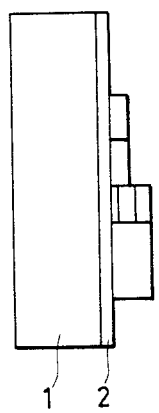
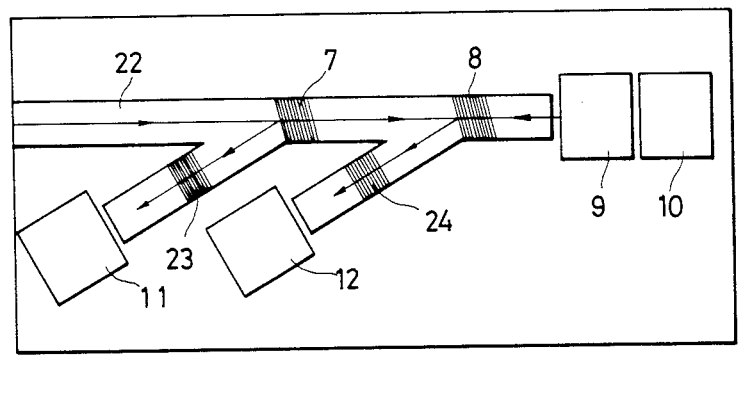
FIG. 7
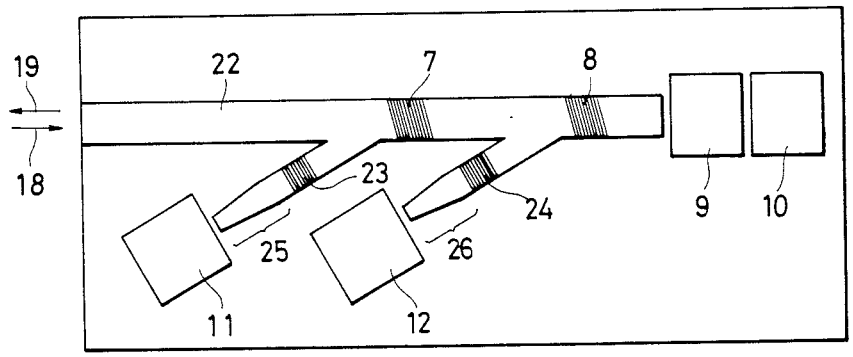

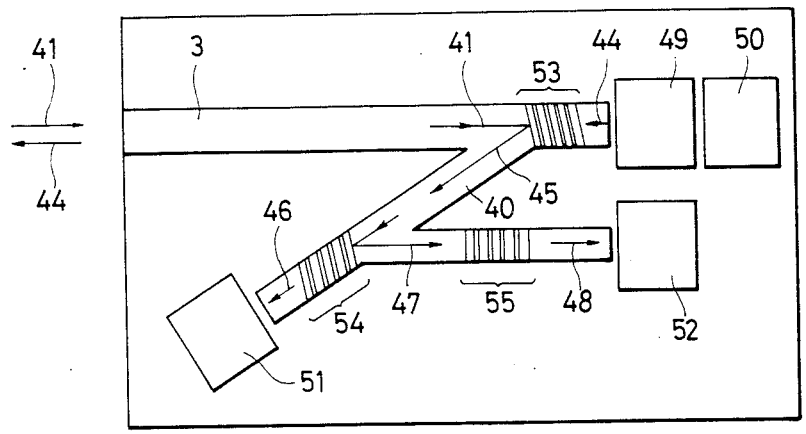
FIG. 23
FIG. 24A
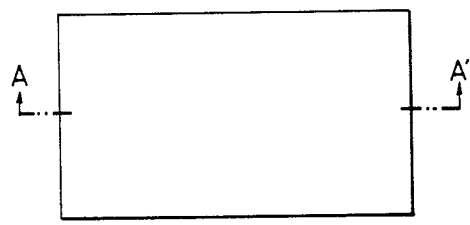
FIG. 24B
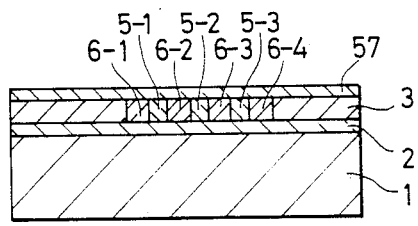
FIG. 24C
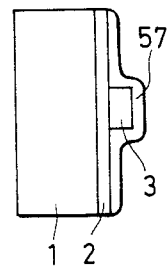

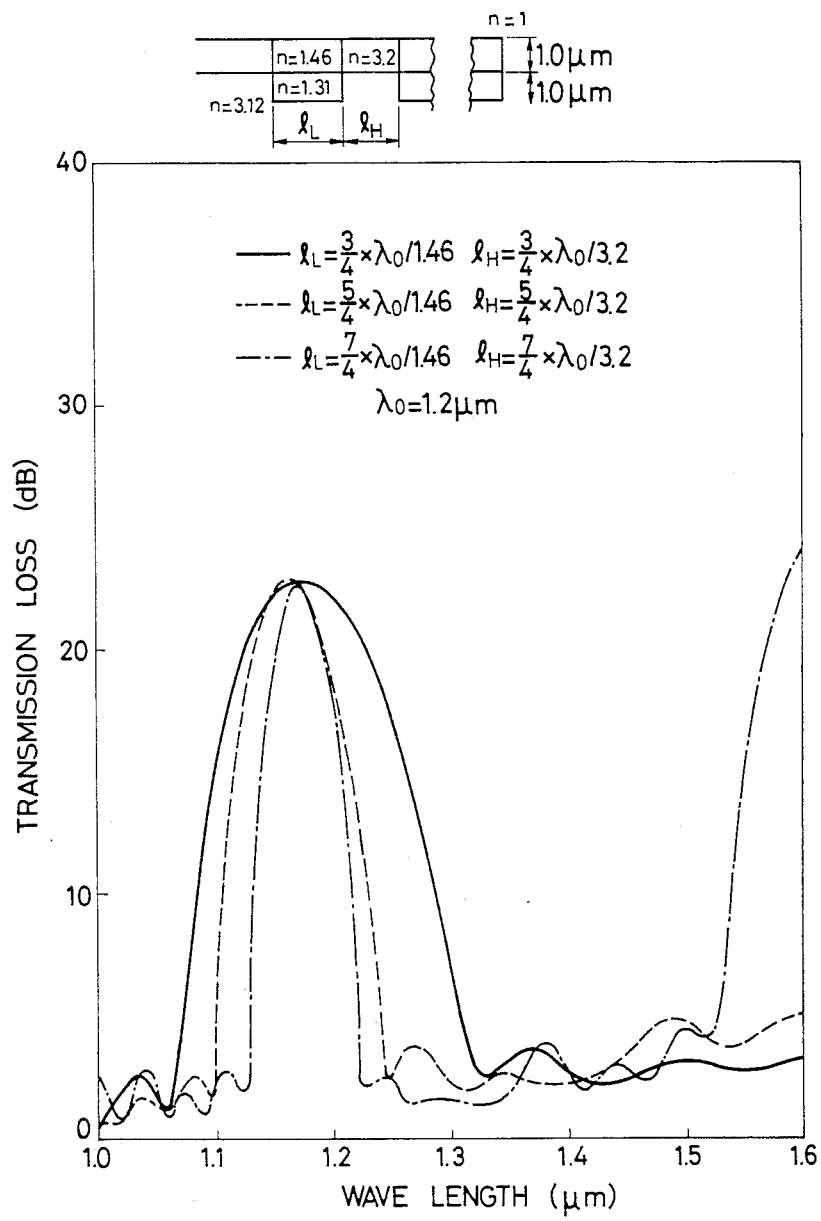

OPTICAL FILTER AND OPTICAL DEVICE USING SAME

BACKGROUND OF THE INVENTION

1. Field of the Invention

This invention relates to a waveguide type optical filter having wavelength selectivity, and more particularly to an optical module for wavelength division multiplexing using a waveguide type optical filter.

2. Description of the Prior Art

The techniques for the multi-wavelength transmission for optical fiber communication is very important for economizing the same communication. In the multi-wavelength transmission, an optical multi/demultiplexer is an essential device.

The conventional optical multi/demultiplexers include an optical multi/demultiplexer constructed by using an optical interference film filter ("Optical Communication Handbook" published by the Asakura Shoten, pages 325-331). The optical multi/demultiplexer using this optical interference film filter has excellent loss characteristics in a pass band and a loss band, and excellent pass band characteristics, and is going to be widely used. In this optical multi/demultiplexer, an optical interference film filter is vacuumevaporated on a glass plate, and this optical interference film filter-carrying glass plate is bonded to a glass block with an adhesive agent. However, it is necessary that an accurate axis-aligning operation be carried out during the bonding of such a filter-carrying glass plate to the glass block with an adhesive agent. When the adhesive agent is applied to the glass plate to a certain thickness, the angle of the glass plate bonded to the glass block becomes different. Therefore, it is necessary to adjust the position and angle of the glass plate while exciting the light. Moreover, the assembly-processing time is required excessively, and this makes it difficult to reduce the manufacturing cost. In addition, this optical multi/demultiplexer also requires the glass block to be lustered, and the size accuracy and the angle accuracy to be improved, so that the device becomes very expensive. The low mass productivity of the device is also a cause of its high price. If a light-emitting semiconductor device and a photo-detector are combined with this optical multi/demultiplexer so as to obtain a hybrid module for bidirectional transmission, much more time is required for assembly-processing the parts and adjusting the optical axis since the object module is a combination of separate parts. The price of such a product also becomes high.

SUMMARY OF THE INVENTION

An object of the present invention is to solve these problems, i.e., provide a one-chip monolithic optical filter capable of being manufactured more simply and more economically by using a process for forming a conventional lightemitting semiconductor device and a conventional photodetector on an optical waveguide, and an optical module using this optical filter.

The optical filter according to the present invention is obtained by forming in an optical waveguide a plurality of gaps of a desired period, a desired width and such a depth that is larger than the thickness of the waveguide so that the gaps are arranged in the light propagation direction. An optically permeable material having a refractive index different from that of the waveguide is packed in these gaps to complete the optical filter. An optical device according to the present invention is formed monolithically by providing at least one optical filter referred to above, on an optical waveguide, and setting one or both of an optical element, i.e. a light-emitting semiconductor device or a photo-detector on the portions of the waveguide which are on the side of an optical signal which permeates through the optical filter and on the side of an optical signal reflected on the same optical filter.

The optical filter according to the present invention is also formed by packing an optically permeable material having a refractive index (nL) different from that nH of the waveguide in the gaps mentioned above. In the case of an optical band rejection filter, the width of the gap is set to $$\frac{m1}{4nL} \lambda 0$$

(wherein m1 is an odd number) with respect to the propagation wavelength $\lambda 0$, and the pitch of the gaps to $$\frac{m1}{4nL} \lambda 0 + \frac{m2}{4nH} \lambda 0$$

(wherein m2 = 1, 3, 5, 7, ...). In the case or an optical band-pass filter, at least one gap of a width of $$\frac{m3}{2nL} \lambda 0$$

(m3 is an odd number), or at least one inter-gap portion of a width of $$\frac{m1}{4nL} \lambda 0 + \frac{m2}{2nH} \lambda 0,$$

or a combination of these is provided at an intermediate section of a row of gaps of $$\frac{m1}{4nL} \lambda 0.$$

These optical waveguide type filters are designed so as to reflect or transmit the light thereon or therethrough owing to the wavelength characteristics thereof, and an optical element, i.e. a light-emitting semiconductor device, or a photo-detector are formed monolithically on the light-transmitting and reflecting sides of the waveguide to thereby obtain an optical device.

BRIEF DESCRIPTION OF THE DRAWINGS

FIG. 2 is a construction diagram of an embodiment of the optical filter according to the present invention, wherein:

FIGS. 4A, 4B, 4C and 4D show the steps of manufacturing the above embodiment;

FIG. 5 shows an embodiment of the multiplex wavelength transmission device, wherein:

FIG. 5A is a front elevation;
and
FIG. 5B is a side elevation.
FIG. 6 shows another embodiment of the same device, wherein:
FIG. 6A is a front elevation;
and
FIG. 6B is a side elevation.
FIG. 7 is a front elevation of still another embodiment of the same device;
FIGS. 10A, 10B, 10C, 14A, 14B, 14C, 19A, 19B, 19C, 21, 22A, 22B and 24A, 24B, 24C show further embodiments of the waveguide type optical filter;
FIG. 23 shows an embodiment of the optical module for wavelength division multiplexing according to the present invention;
FIGS. 27 and 28 are diagrams showing the wavelength characteristics of the optical filter according to the present invention.

DESCRIPTION OF THE PREFERRED EMBODIMENTS

Figure 1:
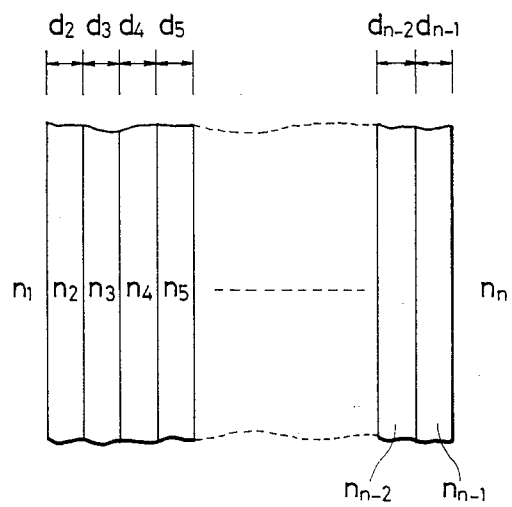
FIG. 1 is a diagram illustrating a general optical filter.

Before describing the embodiments of the present invention, a general description of an optical filter will now be given. An optical filter employs the well-known construction of an optical interference film filter as shown in FIG. 1. In an optical interference film filter, layers of a higher refractive indexes (for example, $n_2$, $n_4$, $n_6$ . . . ) and layers of a lower refractive indexes (for example, $n_3$, $n_5$, $n_7$ . . . ) are formed alternately to a width (in this case, $d_2$, $d_3$ . . . $d_{n-1}$) of substantially $$\frac{m}{4} \cdot \lambda 0$$

(m=1, 3 . . . ), wherein λ0 represents the wavelength of the light.

Figure 2C:
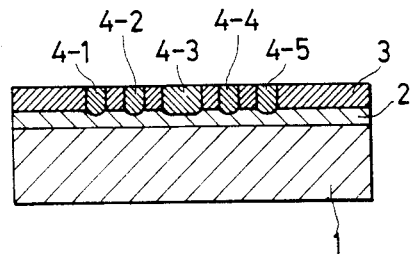
FIGS. 2C, 2D and 2F are sectional views of other examples.
Figure 2A:
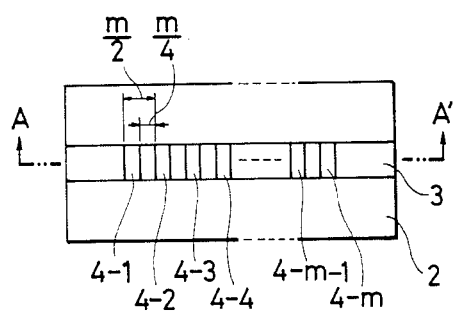
FIG. 2A is a plane view.
Figure 2D:
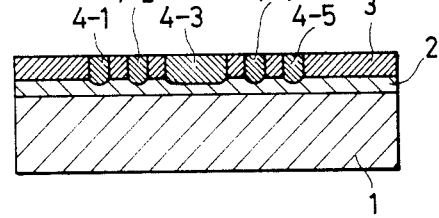
Figure 2B:
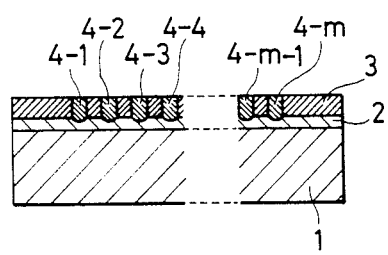
FIG. 2B is a sectional view.
Figure 2E:
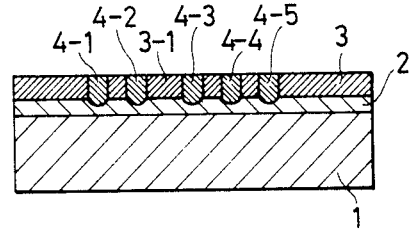
Figure 2F:
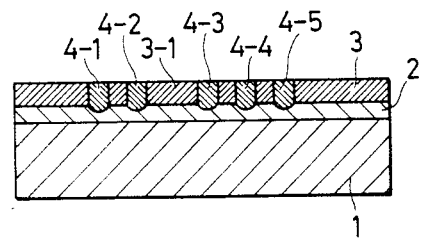

In contrast to this optical interference film filter, an embodiment of the optical filter according to the present invention is as shown in FIGS. 2A and 2B. FIG. 2A is a plane view of the optical filter, and FIG. 2B a sectional view taken along the line A—A' in FIG. 2A. In this embodiment, a plurality of gaps having a width of substantially $$\frac{m}{4} \cdot \lambda 0$$

are formed at substatially m/2 wavelength intervals waveguide layer of a high refractive index (or a low refractive index), and films of a material having a low refractive index (or high refractive index) is packed in these gaps. When a required optical filter has certain wavelength characteristics, at least one gap 4-3 having a width of about $$\frac{m}{2} \lambda 0 \text{ or } \frac{3m}{4} \cdot \lambda 0$$

may be formed at an intermediate portion of the waveguide as shown in FIGS. 2C and 2D, to pack films of a low (or high) refractive index in this gap. Conversely, as shown in FIGS. 2E and 2F, at least one waveguide 3-1 having a width of about $$\frac{m}{2} \lambda 0 \text{ or } \frac{3m}{4} \cdot \lambda 0$$

may be provided in the waveshort guide layer. Namely, a cavity layer is provided so that a short wavelength pass type, long wavelength pass type, band pass type or band rejection type optical filter can be formed. The waveguide layer is formed of a slab waveguide type or three-dimensional waveguide type layer.

Figure 3:
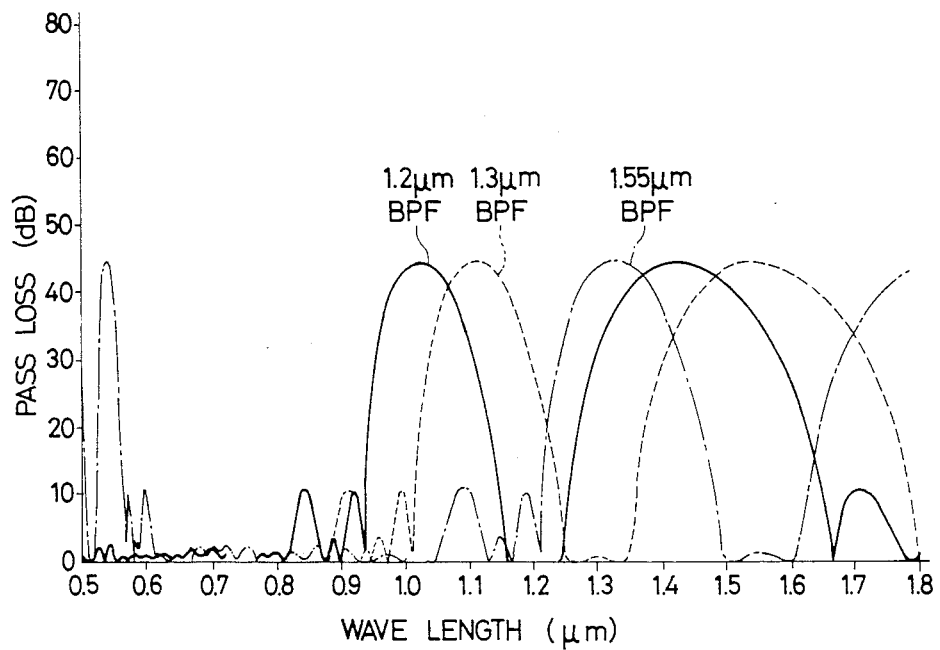
FIG. 3 is a graph showing the calculation results of wavelength characteristics of the above embodiment.

The optical filter shown in FIG. 2 is a slab waveguide type optical filter, in which a substrate 1 consists of a semiconductor, a dielectric, a magnetic substance or glass, a waveguide layer 3 being formed via a cladding layer 2. The cladding layer 2 has a refractive index lower than that of the waveguide layer 3. The layers 4-1~4-m are low refractive index layers the refractive index of which is lower than that of the waveguide layer 3, and they are formed at about m/2 wavelength intervals. It is desirable that the refractive index of the layers 4-1~4-m be higher than that of the cladding layer so as to reduce the radiation loss therein. The width of these low refractive index layers 4-1~4-m is set to about m/4 wavelength. In this embodiment, InP was used for the substrate 1, InP for the cladding layer 2, InGaAsP for the waveguide layer 3, and oxide films, which was obtained by doping $SiO_2$ with $TiO_2$, for the low refractive index layers 4-1~4-m. The results of calculations about an optical filter provided with two cavity layers of a high refractive index and two cavity layers of a low refractive index at an intermediate portion thereof, in which the refractive index of a waveguide layer 3 is set to 3.2; the refractive index of a low refractive index layers 4-1~4-m to 1.8; and the number of layers m to 23, are shown in FIG. 3. The longitudinal axis of FIG. 3 represents the transmission loss (dB) of light, and the lateral axis the wavelength (μm). As may be understood from the drawing, the optical filter works as a band-pass filter when the wavelength λ0 of the light is 1.2 μm, 1.3 μm and 1.55 μm.

FIGS. 4A–4D show the steps of manufacturing this optical filter. FIG. 4A shows a step of forming a cladding layer 2 and a waveguide layer 3 on a substrate 1 by the CVD technique, for example, and FIG. 4B a step of forming gaps 5-1~5-5 by the dry etching. These gaps can be formed by the dry etching in practice with an accuracy of not more than 0.05 μm with respect to a width of 1 μm. Accordingly, when the gap width and gap interval are set to, for example, ¾ wavelength and 3/2 wavelength, respectively, the characteristics shown in FIG. 3 can be obtained. FIG. 4C shows a step of packing oxide films 6 (in this case, films of $TiO_2$-containing $SiO_2$) in the gaps 5-1~5-5 by the plasma CVD technique, for example. FIG. 4D shows a step of etching the oxide film 6 on the waveguide layer 3. The oxide film 6 on this waveguide layer 3 may be left as it is without being etched, for preventing variations in the characteristics, which may occur due to the humidity of the optical filter, and the absorption and scattering loss of light, which may occur due to the contamination of the surface of the optical filter. It is important that the oxide film formed on the waveguide layer 3 has a refractive index lower than that of the low refractive index layers 4-1~4-5, for the purpose of reducing the radiation loss in the waveguide. If a semiconductor material and glass, such as $SiO_2$ are used for the substrate 1 and low refractive index layer 6, respectively, in the optical filter according to the present invention, a refractive index difference can be set large. This enables the pass-band width of the band-pass filter to be increased, and a rejection band to be set large. Accordingly, the number of layers m may be half or not more than a half of that of a conventional optical filter.

FIGS. 5A and 5B show an embodiment of a multiplex wavelength transmission device according to the present invention, wherein FIG. 5A is a front elevation; and FIG. 5B a side elevation. A cladding layer 2 is formed on a substrate 1, and a slab waveguide layer 3, the refractive index of which is higher than that of the cladding layer 2, on the cladding layer 2, optical filters 7, 8 according to the present invention being formed on the slab waveguide layer 3. Reference numerals 13, 14, 15, 16 denote lenses, which are formed of concave recesses made in the slab waveguide layer 3, and which are used to collimate the light projected from an optical fiber 17, and the light from a light-emitting semiconductor element, or focus the light advancing to a photo-detector. The light-emitting semiconductor elements or photo-detectors 9, 10, 11, 12 are fixed to side end surfaces 20, 21 of the slab waveguide layer 3.

The operation of the multiplex wavelength transmission device of FIG. 5 will now be described. A semiconductor laser having a wavelength λ1 (1.55 μm in this case) was used as the light-emitting semiconductor element 9, a Ge-APD (germanium avalanche photodiode) for receiving an optical signal of a wavelength of 1.2 μm as the photo-detector 11, and a Ge-APD for receiving an optical signal of a wavelength of 1.3 μm as the photo-detector 12. A along-wavelength passing type filter, which is adapted to pass optical signals of wavelengths of 1.3 μm and 1.55 μm therethrough and reflect an optical signal of a wavelength of 1.2 μm thereon, was used as the optical filter 7, and an optical band rejection filter, which is adapted to pass optical signals of wavelengths of 1.2 μm and 1.55 μm therethrough and reflect an optical signal of a wavelength of 1.3 μm thereon, as the optical filter 8. An optical signal of 1.55 μm is propagated in an optical fiber 17 in the direction of an arrow 19, and the optical signals of wavelengths of 1.2 μm and 1.3 μm propagated in the direction of an arrow 18 are received by the photo-detectors 11, 12. Reference numeral 10 denotes a photo-detector for monitoring a signal of the light from the light-emitting semiconductor element 9. The light-emitting semiconductor element and photo-detector may be grown in a liquid phase epitaxyonthe substrate 1, or fixed thereto from the outside.

FIGS. 6A and 6B show a multiplex wavelength transmission device, another embodiment of the present invention, wherein FIG. 6A is a front elevation; and FIG. 6B a side elevation. This embodiment is a device having a threedimensional waveguide structure, in which the parts designated by the same reference numerals as in FIG. 5 have the functions identical with those of the parts of these reference numerals shown in FIG. 5. Referring to FIG. 6, reference numeral 22 denotes a waveguide layer, which has a raised strip type structure in this embodiment, and which may have a ridge type or diffusion type structure, and 23, 24 band-pass filters, the band-pass filter 23 being adapted to pass an optical signal of a wavelength of 1.2 μm alone therethrough, the band-pass filter 24 being adapted to pass an optical signal of a wavelength of 1.3 μm alone therethrough.

FIG. 7 shows still another embodiment of the multiplex wavelength transmission device according to the present invention, in which tapering portions 25, 26 are provided at the parts of a waveguide layer which are in front of the photo-detectors 11, 12, to adiate unnecessary optical signals to the outside of the waveguide and thereby reduce such optical signals. This embodiment is identical with the embodiment of FIG. 6 except that these tapering portions 25, 26 are provided.

Figure 8:
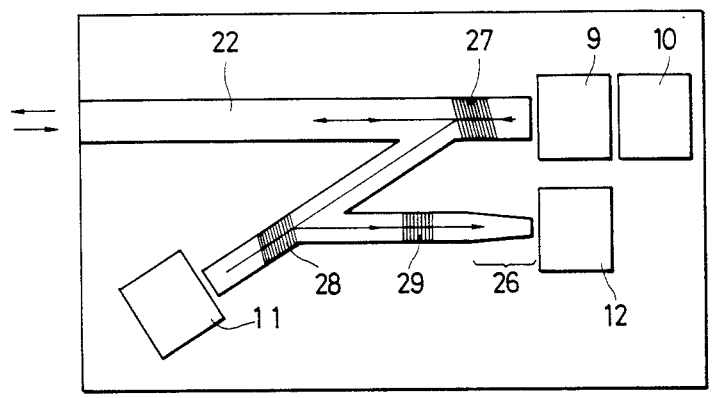
FIG. 8 is a front elevation of a further embodiment of the same device.

FIG. 8 shows a further embodiment of the multiplex wavelength transmission device according to the present invention. In this embodiment, a semiconductor laser having a wavelength of 1.3 μm was used as a light-emitting semiconductor element 9, a light-receiving element adapted to receive an optical signal having a wavelength of 1.2 μm as a photo-detector 11, and a light-receiving element adapted to receive an optical signal having a wavelength of 1.55 μm as a photo-detector 12. Band-pass filters having the characteristics shown in FIG. 3 were used as optical filters 27, 28, 29. Namely, in the embodiment of FIG. 3, a 1.3 μm band-pass filter (BPF) adapted to pass a 1.3 μm optical signal therethrough and reflect 1.2 μm and 1.55 μm optical signals was used as the optical filter 27, a 1.2 μm band-pass filter as the optical filter 28, and a 1.55 μm band-pass filter as the optical filter 29.

Figure 9:
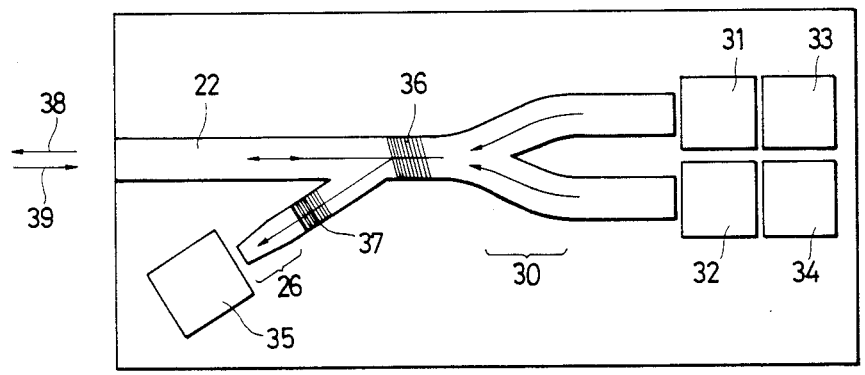
FIG. 9 is a front elevation of a further embodiment of the same device.

FIG. 9 shows a further embodiment of the multiplex wavelength transmission device according to the present invention. This embodiment is an embodiment of a so-called multiplex three-wavelength transmission device, in which 1.2 μm and 1.3 μm optical signals are transmitted in the direction of an arrow 38 with a 1.55 μm optical signal transmitted in the opposite direction of an arrow 39. Referring to FIG. 9, reference numerals 31, 32 denote a semiconductor laser having a wavelength of 1.2 μm and a semiconductor laser having a wavelength of 1.3 μm, 33, 34 photo-detectors for monitoring the light from these semiconductor lasers 31, 32, and 30 elements for multiplexing the emitted 1.2 μm and 1.3 μm laser beams. An optical filter 36 is a short-wavelength pass type or band rejection type filter adapted to pass 1.2 and 1.3 μm optical signals therethrough and reflect a 1.55 μm optical signal. The optical filter 37 is a longwave-length pass type filter adapted to reflect 1.2 μm and 1.3 μm optical signals.

The present invention is not limited to the above-described embodiments. First, the number of wavelengths to be multiplexed is not limited to three in the above embodiments. Namely, it can be increased to any number which is not less than two. The light-emitting semiconductor elements may by substituted by semiconductor lasers or light-emitting diodes. In the embodiment of FIG. 5, the semiconductor lasers may consist of surface emission type lasers which are adapted to emit a laser beam at right angles to the substrate. The photo-detectors may consist of InGaAs-APD or InGaAs-PINPD (PIN photodiodes) besides Ge-APD. The films 6 packed in the gaps 5-1~5-5 may consist of a material containing a refractive index-controlling dopant, such as $TiO_2$, $GeO_2$, $PeO_5$, ZnO and $Al_2O_3$ besides a single-component material $SiO_2$. These films may also consist of a semiconductor material, such as InGaAsP, AlGaAs and GaAs, a dielectric or a magnetic material. In addition to the bidirectional transmission system, an optical multiplex device or an optical demultiplex device, which constitutes a single directional transmission system, may also by used as the optical transmission system. These systems can be formed by using optical elements consisting of light-emitting semiconductor elements alone or photo-detectors alone. If, in the embodiment of FIG. 4, the substrate 1, cladding layer 2 and waveguide layers 3 are formed of, for example, Si, a layer of $B_2O_3$-containing $SiO_2$ and $SiO_2$, respectively, and, if films of a high refractive index, which consist of $TiO_2$ or $SiO_2$ containing a refractive index-increasing dopant, are then formed in the gaps 5-1~5-5, a glass waveguide type optical filter can be obtained. It is possible that this optical filter has the characteristics of an extremely low loss as compared with an optical filter using a semiconductor material. The gaps 5-1~5-5 shown in FIG. 4B can be formed by the dry etching, such as the ion beam etching, high-frequency sputter etching, reactive high-frequency sputter etching, plasma etching and ion-applying acceleration etching, or equivalent etching techniques.

As described above, the optical filter and the multiplex wavelength transmission device using this optical filter according to the present invention can be obtained by forming in a slab or a waveguide layer in a three-dimensional optical waveguide a plurality of gaps, each of which has a desired width and a depth larger than the thickness of the waveguide layer, so that the gaps are arranged at desired period intervals along the light-propagating direction; filling these gaps with films of a material having a refractive index different from that of the waveguide layer, to form an optical filter; and providing one or both of a light-emitting semiconductor element and a photo-detector at the side of an optical signal which has passed through the optical filter, and at the side of an optical signal which has been reflected on the optical filter to form the filter monolithically. Thus, an optical filter of novel construction can be formed by using a conventional process for forming light-emitting semiconductor elements and optical detectors. Furthermore, a simpler and more economical multiplex wavelength transmission device can be obtained by using this optical filter.

Figure 10A:
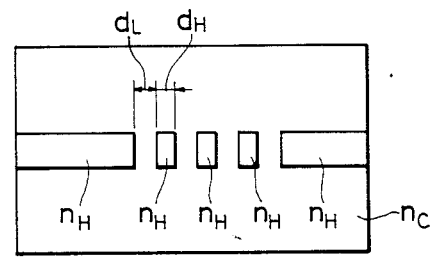
Figure 10B:
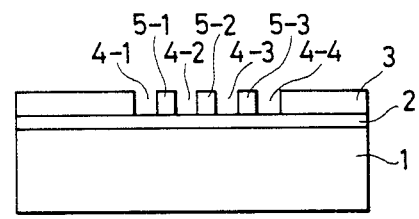
Figure 10C:
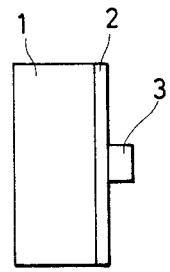

FIG. 10 shows a further embodiment of the optical waveguide type filter according to the present invention. FIG. 10A is a top view, FIG. 10B a front elevation, and FIG. 10C a left side elevation. Reference numeral 1 denotes a substrate of a semiconductor, a high-degree dielectric, a magnetic material, or glass, 3 a waveguide layer having a refractive index of nH, 2 a cladding layer the refractive index nc of which is lower than that nH of the waveguide layer 3, and 4-1~4-4 gaps. The width dL of each gap is set to $$\frac{m1}{4nL} \lambda 0$$

(m1=any one of 1, 3, 5, 7, ... ) with respect to the center wavelength λ0, and the depth of the gap equal to or larger than the thickness of the waveguide layer 3. The nL represents the refractive index of the gap. In this case, the gap consists of air, so that nL=1. Both side surfaces of the gap are made substantially perpendicular. These gaps 4-1~4-4 are formed by, for example, the dry etching. According to the currently-available dry etching techniques, a gap of 0.5 μm in width and 7 μm in width can be formed satisfactorily. For example, if the wavelength λ0=1.2 μm, the refractive index of the gap nL=1, m1=3, dL is 0.9 μm in accordance with the above equation $$dL = \frac{m1}{4nL} \lambda 0.$$

A gap of this width can be formed satisfactoril the m1 is, the more easily the gap can be formed. However, when m1 becomes larger, the specific band for the filter becomes narrow. Therefore, it is necessary that m1 be determined so that the manufacturing accuracy and specific band are balanced with each other. Reference numerals 5-1~5-3 denote the portions of the waveguide layer which are left after the dry etching of the layer, and the width dH of each of these portions is set to $$\frac{m2}{4nH} \lambda 0$$

(m2=any one of 3, 5, 7, ... ). If a compound semiconductor, for example, InP is used for the substrate, the refractive index nH of the waveguide layer 3, which consists of InGaAsP, is about 3.2. If λ0=1.2 μm, dH is about 0.28 μm when m2 is 3; about 0.47 μm when m2 is 5; and about 0.66 μm when m2 is 7. Therefore, m2 is preferably set to 5 or 7 taking the current dry etching techniques into consideration.

Figure 11:
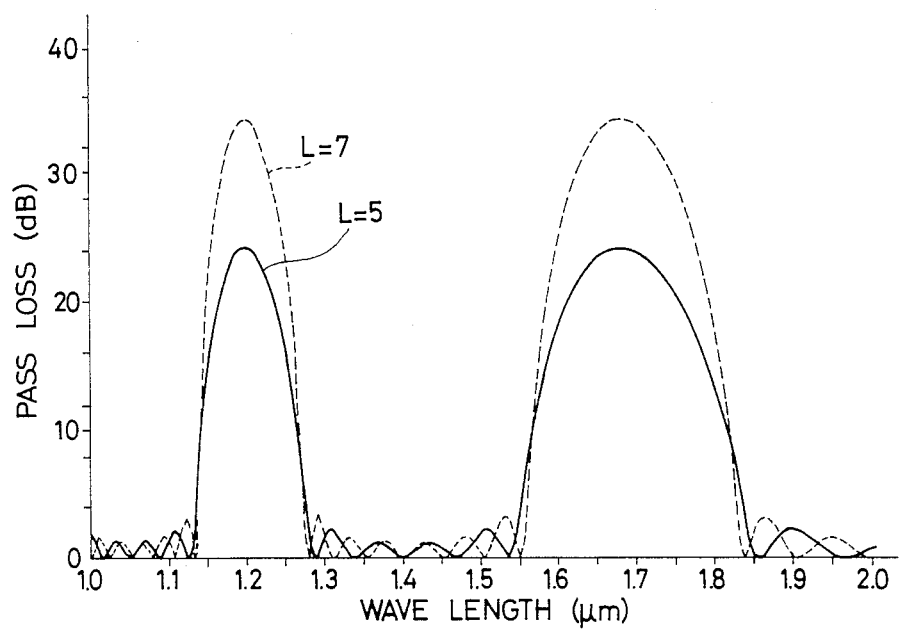
FIGS. 11, 12, 13, 15, 16, 17 and 18 are characteristic diagrams of the waveguide type optical filter according to the present invention.

FIG. 11 shows an example of the wavelength characteristics of the optical waveguide type filter of FIG. 10. It shows the results of calculations about the filter, in which the substrate 1 consists of InP; the waveguide layer 3 consists of InGaAsP (refractive index nH=3.2); nL=1 (air); λ0=1.2 μm; and m1=m2=7. L=7 denotes the characteristics of this type of filter in which four gaps are formed, and L=5 the characteristics of a similar filter in which three gaps are formed. These characteristics are expressed on the basis of the results of proximate calculations of the plane wave propagation. They become slightly different when the propagation modes are taken into consideration but substantially identical when they are determined on the basis of the proximate calculation results. As may be understood from the above results, when around three to four gaps are provided, the attenuation rate of the rejection band becomes very high, and the attenuation gradient from the pass band to the rejection band becomes large. The reasons reside in that a difference between the refractive indexes nH, nL is very large as compared with that between the refractive indexes of a high refractive index layer and a low refractive index layer of a regular optical interference film filter. Moreover, even when m1=m2=7, a band rejection filter having a large rejection band width can be advantageously formed. In a conventional interference film filter, a film of only ¼ wavelength can be formed, while, in the filter according to the present invention, a film of not less than ¾ wavelength can be obtained.

Figure 12:
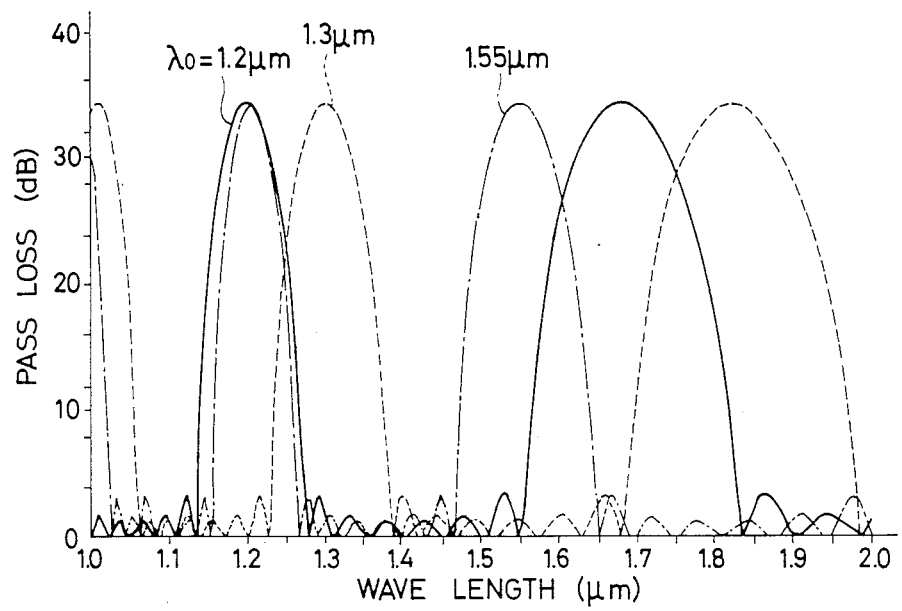

FIG. 12 shows the results of calculations of the wavelength characteristics of the embodiment of FIG. 10, in which λ0 is set to 1.2 μm, 1.3 μm and 1.55 μm.

Figure 13:
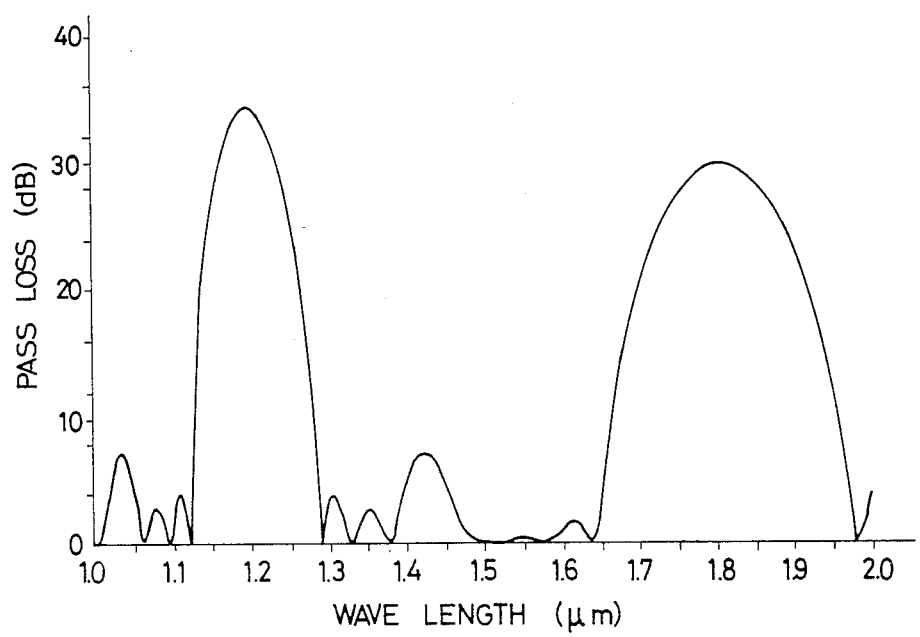

FIG. 13 shows the results of an example of calculations of the wavelength characteristics of the optical waveguide type filter in the embodiment of FIG. 10, in which the refractive indexes are set to m1=5 and m2=7. As may be understood from a comparison between FIGS. 13 and 11, the wavelength characteristics vary. Namely, in the wavelength characteristics shown in FIG. 11, the center wavelengths of rejection band are 1.2 μm and about 1.7 μm, while, in the wavelength characteristics shown in FIG. 13, the center wavelengths of rejection band are 1.2 μm and 1.8 μm. The filter of the wavelength characteristics of FIG. 13, which has lowloss pass characteristics in the vicinity of 1.55 μm, can be used as a filter having a 1.55 μm pass band and a 1.2 μm rejection band. Thus, if m1 and m2 are set to levels selected from 1, 3, 5, 7, ... and combined arbitrarily, filters having various filter characteristics can be obtained.

Figure 14A:
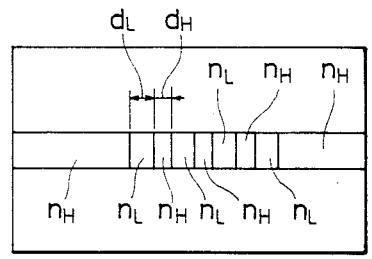
Figure 14B:
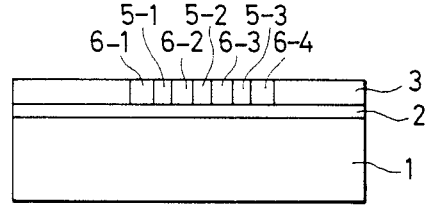
Figure 14C:
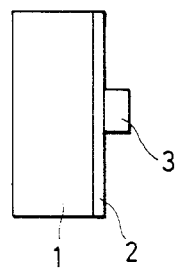

FIG. 14 shows a further embodiment of the optical waveguide type filter according to the present invention. FIG. 14A is a top view, FIG. 14B a front elevation, and FIG. 14C a left side elevation. The parts of this embodiment which have the same reference numerals as those of the embodiment of FIG. 10 have the same functions. Reference numerals 6-1~6-4 denote gaps formed by packing films of a low refractive index nL in the gaps similar to those shown in FIG. 10. These films may consist of $SiO_2$ or $SiO_2$ containing a refractive index controlling dopant ($TiO_2$, $PaO_5$, $GeO_2$, $B_2O_3$).

Figure 15:
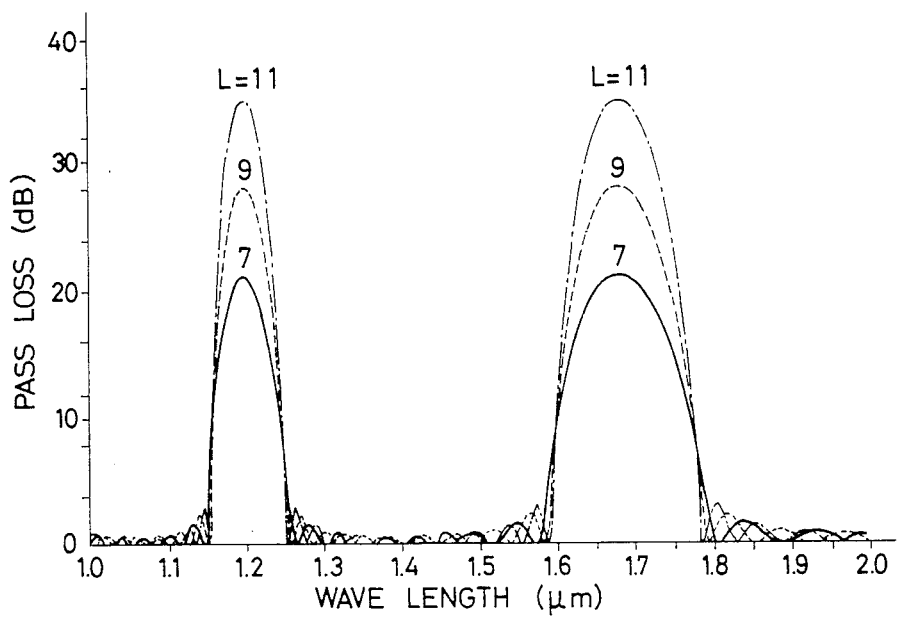

FIG. 15 shows the results of calculations about the wavelength characteristics of the embodiment of FIG. 14. This drawing shows the characteristics of optical filters, which have a substrate 1 of InP, a waveguide layer 3 of InGaAsP (refractive index nH=3.2), rectangular groove fillings 6-1~6-4 of $SiO_2$ (nL=1.46), and m1=m2=7, and which use four groove fillings (corresponding to L=7), five groove fillings (corresponding to L=9) and six groove fillings (corresponding to L=11). The calculation results relative to the rejection band center wavelength of 1.2 μm show that these simply-constructed filters can obtain a very high rejection band attenuation rate.

Figure 16:
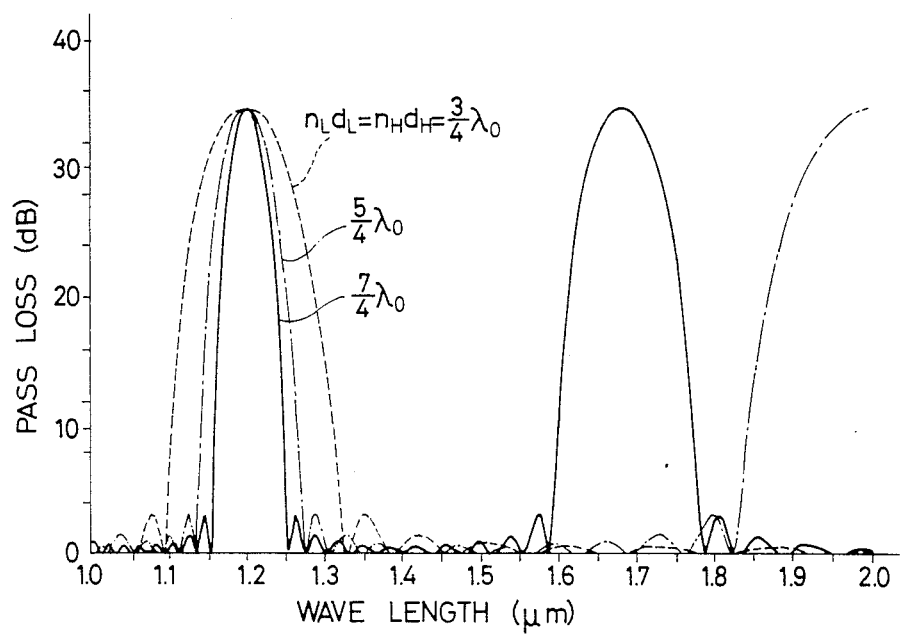

FIG. 16 shows the results of calculations about the embodiment of FIG. 15, in which L=11; and m1=m2=3, 5 and 7. It is understood that the specific band in the rejection band decreases in inverse proportion to the values of m1 and m2, and that, however, in order to carry out the bidirectional multiplex wavelength transmission using wavelengths of 1.2 μm, 1.3 μm and 1.55 μm, m1 and m2 should preferably have a value of around 7 in contrast to the above case.

Figure 17:
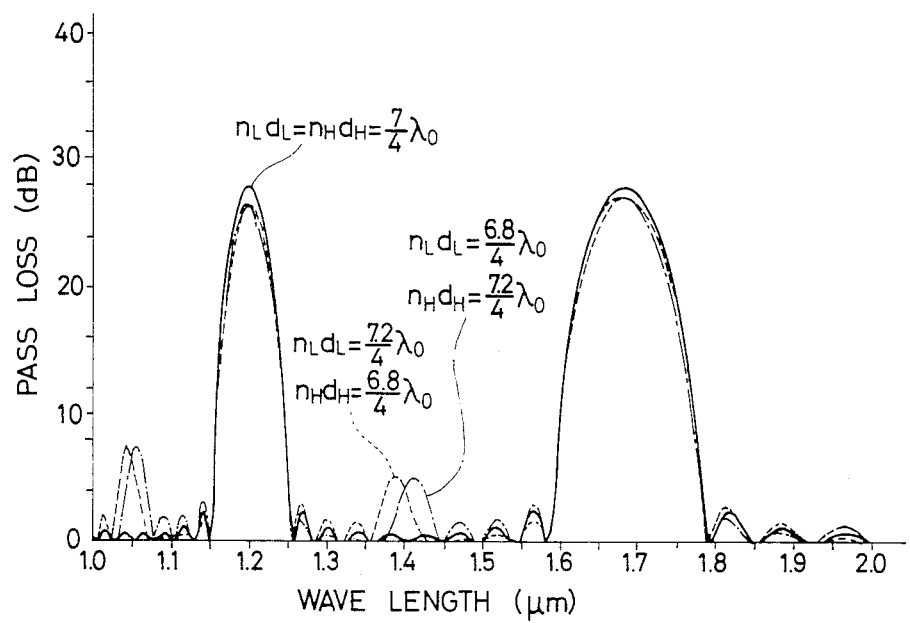

FIG. 17 shows the characteristics of the embodiment of FIG. 15, in which L=9; and dL and dH deviate by several percent from predetermined levels $$\left( dL = \frac{7}{4nL} \lambda 0, dH = \frac{7}{4nH} \lambda 0 \right).$$

In this optical waveguide type filter, when dL becomes small, dH becomes large correspondingly, and, conversely, when dL becomes large, dH becomes small correspondingly. In a gap-forming process, the above-mentioned phenomena necessarily occur. The characteristic curves in FIG. 17 show such cases. Referring to this drawing, the solid curve shows the characteristics of a filter in normal condition $$\left( nLdL = nHdH = \frac{7}{4} \lambda 0 \right),$$

the broken line the characteristics of a filter in which the width of the gaps is too large $$\left( nLdL = \frac{7.2}{4} \lambda 0, nHdH = \frac{6.8}{4} \lambda 0 \right),$$

and the one-dot chain line the characteristics of a filter in which the width of the gaps is too small in contrast to the preceding case. As may be understood from this drawing, even when there are any dimensional errors in the widths of the gaps formed, they offset each other and substantially do not have influence upon the wavelength characteristics. These constitute the unique features of the present invention. In a conventional optical interference film filter, layers are laminated one by one, and, moreover, a refractive index difference cannot be set large. Therefore, such an extremely high manufacturing accuracy was demanded that an error of the thickness of each layer has to be controlled to be not more than 1%. On the other hand, in the case of the optical waveguide type filter according to the present invention, the gaps are formed after the waveguide layer has been formed. During this time, if dL is small, dH necessarily becomes large correspondingly, and, conversely, if dL becomes large, dH necessarily becomes small correspondingly. Consequently, nLdL+nHdH is maintained at a level, $$\frac{(m1 + m2)}{2} \lambda 0.$$

Therefore, the characteristics substantially identical with the normal wavelength characteristics can be obtained as shown in FIG. 17.

Figure 18:
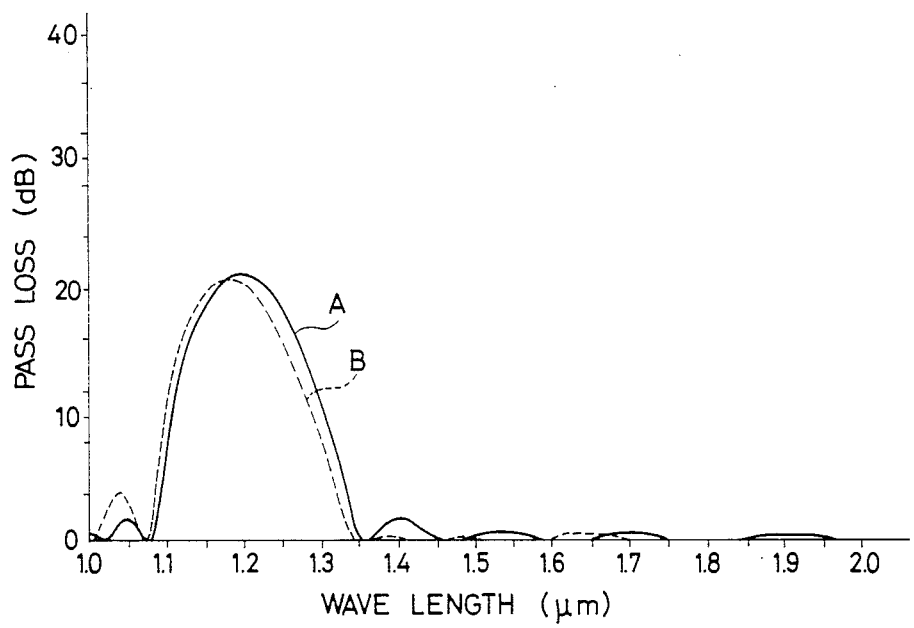

FIG. 18 shows a further example of calculations of the wavelength characteristics of the optical waveguide type filter according to the present invention. This drawing shows the characteristics of the embodiment of FIG. 15, in which L=7; nLdL=nHdH=$\frac{3}{4}$λ0; and λ0=1.2 μm. The solid curve A represents the characteristics of the filter which has not yet been improved, and the broken curve B the results in a case where the pass loss on the larger wavelength side of 1.35 μm is reduced. In order to reduce this pass loss value, the gap width dL on the input and output sides may be in this case set, for example, slightly smaller than $$\frac{3}{4nL} \lambda 0.$$

In order to further reduce the pass loss, at least one ot dL and dH may be shifted from a predetermined levels. Changing nL and nH instead of dL and dH also enables the same characteristics to be obtained.

Figure 19A:
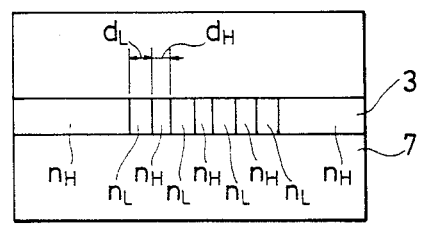
Figure 19B:
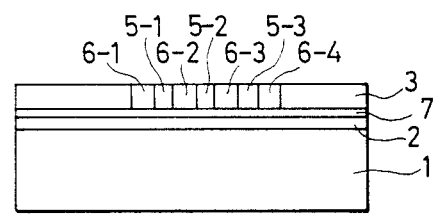
Figure 19C:
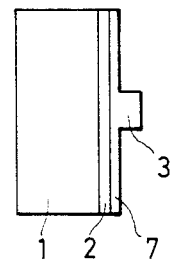

FIG. 19 shows a further embodiment of the optical waveguide type filter according to the present invention. This embodiment uses a ridge waveguide layer (a portion designated by the reference numerals 3 and 7).

The depth of gaps is set equal to or larger than the thickness of the layer 3, 7.

Figure 20A:
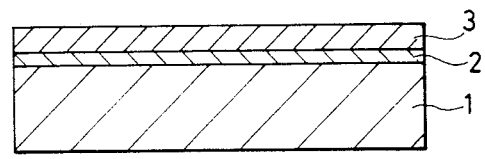
FIGS. 20A, 20B, 20D show the steps of manufacturing the waveguide type optical filter according to the present invention.
Figure 20B:
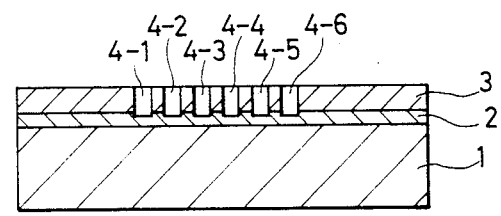
Figure 20C:
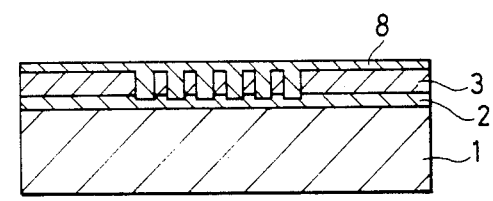
Figure 20D:
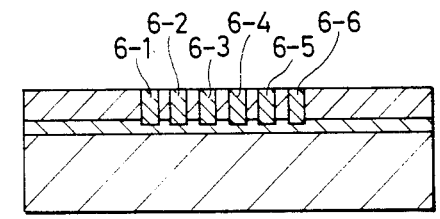

FIGS. 20A–20D shows the steps of manufacturing the optical waveguide type filter according to the present invention. FIG. 20A shows a step of forming a cladding layer 2 and a waveguide layer 3 on a substrate 1. FIG. 20B shows a step of forming gaps 4-1~4-6 by an etching means, such as the dry etching. FIG. 20C shows a step of packing a film 8 in the gaps. FIG. 20D shows a step of etching the film on the waveguide layer 3. When the refractive index of the film is lower than that of the waveguide layer 3, the film 8 on the waveguide layer may be left as it is to obtain a higher optical stability of the filter. Namely, it is recommended that the film 8 be left as it is without being etched, for the purpose of preventing the humidity of the filter from causing the fluctuations of the characteristics thereof, and the contamination of the surface of the filter from causing an increase in the absorption and scattering of the light.

Figure 21:
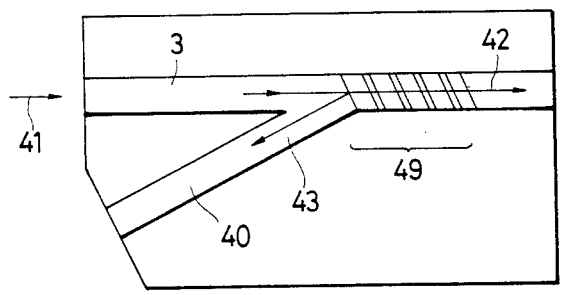

FIG. 21 shows an example of the application of the optical waveguide type filter according to the present invention. In this example, an optical waveguide type filter 49 is formed on a portion of a Y-shaped waveguide. The optical signals of wavelengths λ1, λ2 entering a waveguide layer 3 in the direction of an arrow 41 propagate in the interior thereof and enters the optical waveguide type filter 49. This filter has the characteristics (identical with those shown in FIG. 13, in the filter, which has these characteristics, λ1 and λ2 being 1.2 μm and 1.55 μm, respectively) of rejecting and reflecting an optical signal of a wavelength λ1 and passing an optical signal of a wavelength λ2 therethrough. Accordingly, an optical signal of a wavelength λ2 (1.55 μm) passes through the filter in the direction of an arrow 42, and an optical signal of a wavelength λ1 (1.2 μm) is reflected thereon. Since the filter is formed diagonally with respect to the incident wave, the reflected optical signal propagates in the direction of an arrow 43 in the interior of a branch waveguide layer 40. Namely, a filter for demultiplexing optical signals of wavelengths λ1, λ2 is formed.

The embodiments, which have described so far, of the optical waveguide type filter relate to band rejection type filters. A band-pass type filter can also be formed. In a band-pass type filter, at least one gap having a width of $$\frac{m3}{2nL} \lambda 0$$

Figure 22A:
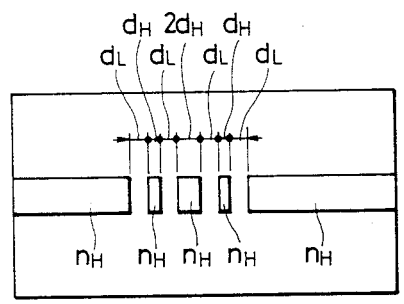
Figure 22B:
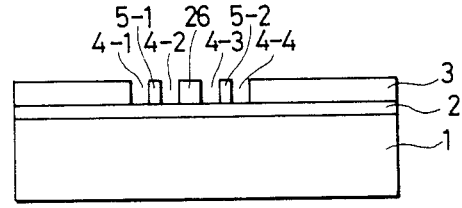

(m3=1, 3, 5, ... ), i.e. a cavity layer may be provided in an intermediate position in the periodic gaps, or at least one portion in which the distance between the centers of two adjacent gaps is $$\frac{m1}{4nL} \lambda 0 + \frac{m2}{2nH} \lambda 0$$

may be provided, or a combination of such a cavity and such a portion may be provided. An example of such a filter provided with one cavity is shown in FIG. 22. FIG. 22A is a top view, and FIG. 22B a side elevation, in which reference numeral 26 denotes a cavity, the width of a waveguide layer being $$2dH \left( = \frac{2m2}{4nH} \lambda 0 \right).$$

An embodiment of the optical module for wavelength division multiplexing using the above-described optical waveguide type filter will now be described.

FIG. 23 shows an embodiment of an optical module for multiplex transmission of three wavelengths. Optical signals λ1, λ3 (λ1=1.2 μm, λ3=1.55 μm) enter a waveguide layer 3 in the direction of an arrow 44. Reference numeral 90 denotes a light-emitting semiconductor element having a wavelength of λ2, 50 a photodetector for monitoring an optical signal of λ2, 51 a photo-detector for receiving an optical signal having a wavelength of λ1, 52a photo-detector for receiving an optical signal having a wavelength of λ3, and 53, 54, 55 waveguide type filters. The reference numeral 53 denotes a filter (the characteristics of which are shown by a one-dot chain line in FIG. 12) having a center wavelength of 1.55 μm, 54 a bandpass filter adapted to pass only an optical signal of a wavelength of λ1 therethrough, and 55 a band-pass filter adapted to pass only an optical signal of a wavelength of λ3 therethrough. When the module is formed in this manner, an optical signal (of a wavelength of λ2) from the light-emitting semiconductor element 90 enters the waveguide layer 3, passes through the optical filter 53, and is transmitted from the module to the interior of an optical fiber (not shown) in the direction of an arrow 44. On the other hand, the optical signals having wavelengths of λ1, λ3 transmitted in the direction of an arrow 41 enters the interior of the waveguide layer 3 to reach the optical filter 53. These optical signals of λ1, λ3 are then reflected on this optical filter 53 to propagate into the interior of a branch waveguide layer 40 in the direction of an arrow 45 and enter the optical filter 54. The optical signal of the wavelength λ1 passes through this optical filter 54 to be received by a photodetector 51. The optical signal of the wavelength λ3 is reflected on the optical filter 54 to propagate in the direction of an arrow 47, pass through the optical filter 55, and be received by a photo-detector 52.

The radiation loss and scattering loss from the waveguide layer 3 may be reduced by covering the waveguide layer 3 with a film 57 of a low refractive index nP (nP≦nL) as shown in FIG. 24. FIG. 24A is a top view, FIG. 24B a sectional view taken along the line A—A' in FIG. 24A, and FIG. 24C a left side elevation. The film 57 of a low refractive index is formed of a film of SiO₂ or a film of SiO₂ doped with B₂O₃ or F, for example, when the rectangular groove fillings 6-1~6-4 consist of SiO₂.

Figure 25A:
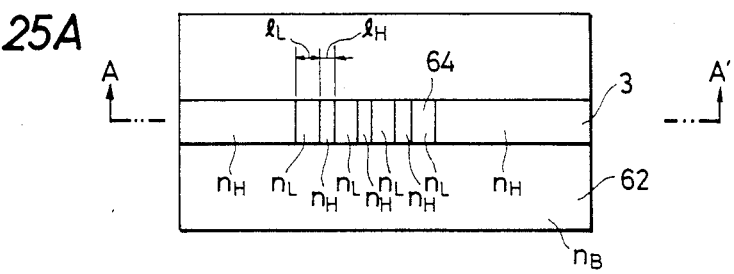
FIGS. 25A, 25B, 25C, 29A, 29B, 29C and 30A, 30B show the embodiments of the optical filter according to the present invention.
Figure 25B:
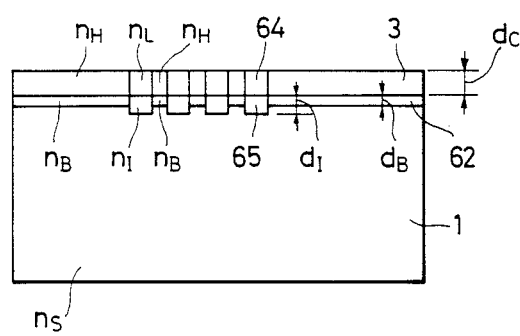
Figure 25C:
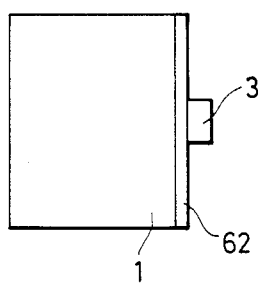
Figure 26:
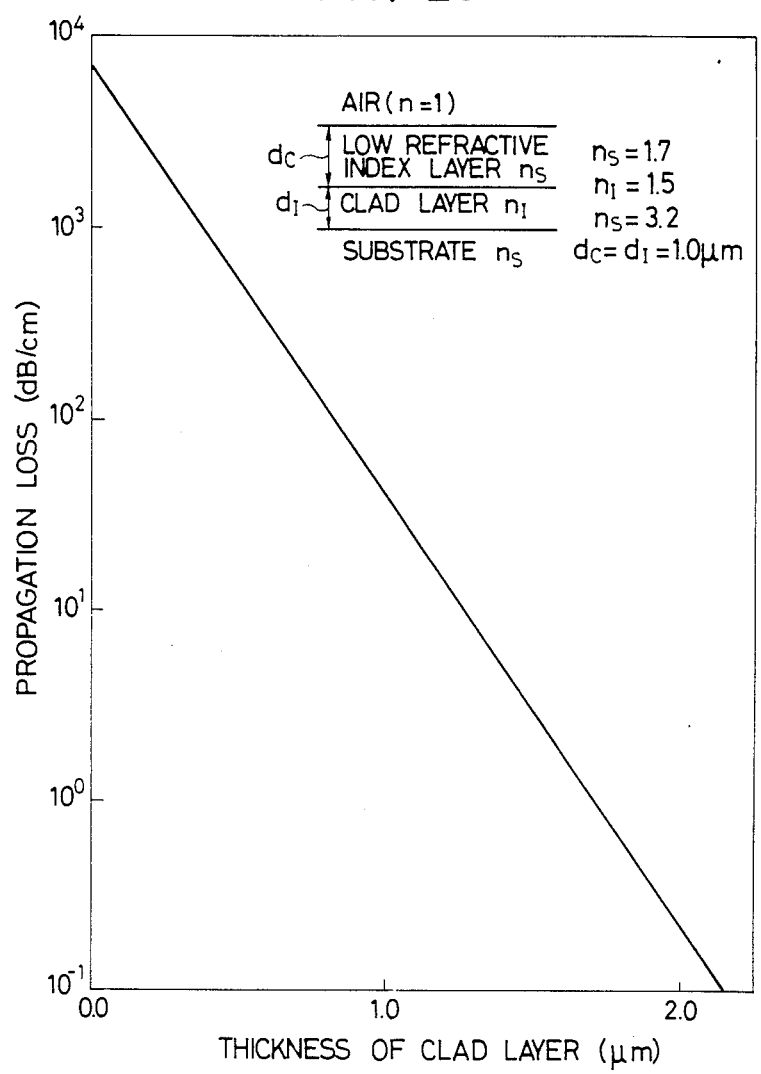
FIG. 26 is a diagram showing the transmission loss characteristics of a clad layer-added waveguide.
Figure 27:
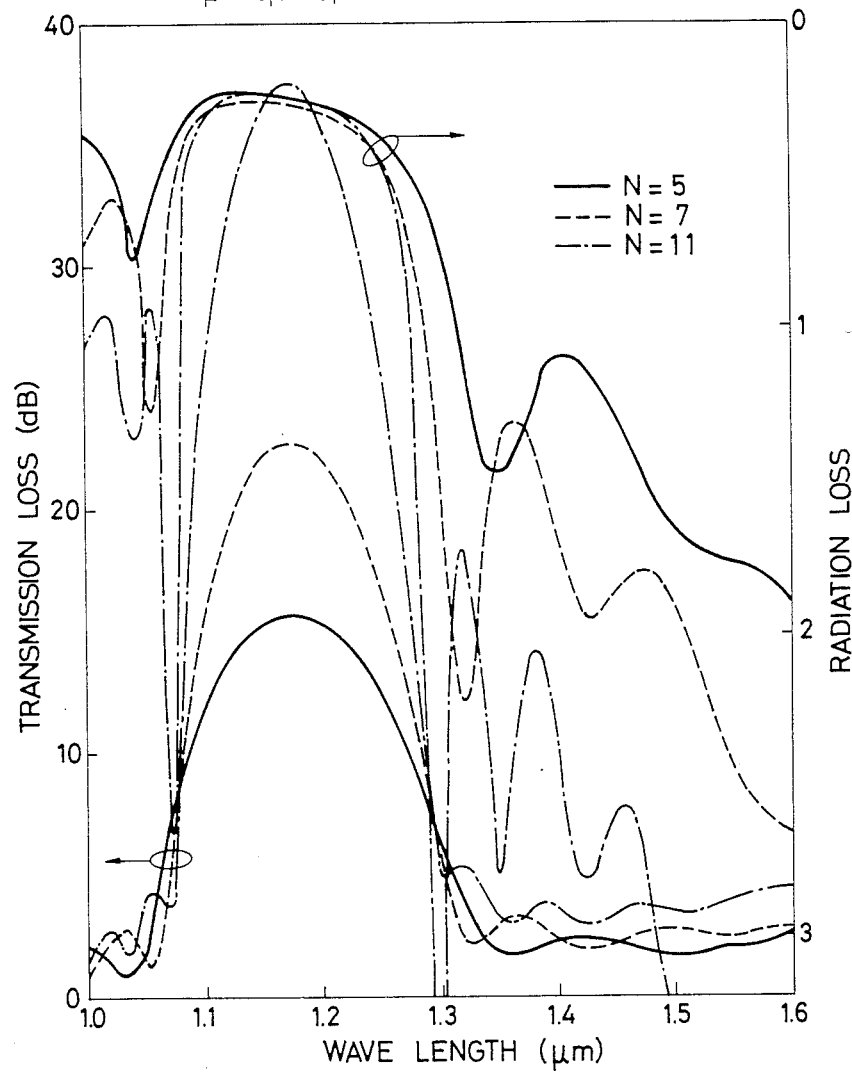

FIG. 25 shows a further embodiment of the optical filter according to the present invention. FIG. 25A is a top view, FIG. 25B a sectional view taken along the line A—A' in FIG. 25A, and FIG. 25C a side elevation. Reference numeral 1 denotes a substrate, which may be formed of an arbitrarily-selected material, such as a semiconductor, a dielectric or a magnetic substance, 3 a waveguide layer having a refractive index of nH, 62 a first cladding layer having a refractive index of nB which is lower than nH, 64 a layer of a low refractive index nL which is lower than nH, and 65 a second cladding layer the refractive index of which has to be selectively set lower than nL. A structure in which a second cladding layer 65 is provided under a layer 64 of a low refractive index constitutes the important characteristics of the optical filter according to the present invention, and providing this second cladding layer 65 makes it possible to set the refractive index nL of the layer of a low refractive index irrespective of the refractive index nS of the substrate 1. When nL is set lower than nS in a structure, in which a second cladding layer 65 is not provided, the light leaks into the substrate to cause a great loss. Therefore, it is difficult to determine nL and nS so that they have a large difference. FIG. 26 shows calculation values of a loss of a waveguide which is provided with the second cladding layer 65. As may be understood from this drawing, the loss can be reduced exponentially by increasing the thickness of the second cladding layer 65. Accordingly, even when nL is set lower than nS, the loss can be reduced to a satisfactorily low level by increasing the thickness of the second cladding layer 65, so that a difference between nH and nL can be increased to an arbitrary extent. The difference between nH and nL is inversely proportional to the number of the filters. When the difference between nH and nL can be increased, the number of filters can be reduced, so that the device can be miniaturized to a great extent. The examples of calculation values of the characteristics of filters having an InP substrate 1, an InP layer 62 (doped with a certain substance at a low ratio), an InGaAsP layer 3, and layers 64, 65 consisting of $SiO_2$ doped with $TiO_2$ (the concentration of the dopant in the layer 64 is higher than that of the dopant in the layer 65) are shown in FIGS. 27 and 28. The value of dH is determined selectively so that the waveguide has a single mode. The values of lL, lH may be selectively set to $$lL = \frac{m1}{4nL} \lambda 0, \quad lH = \frac{m2}{4nL} \lambda 0$$

(m1, m2 = 1, 3, 5, 7 . . . ), wherein $\lambda 0$ center wavelength of a filter. It is understood from these drawings that the filters have a structure of a band rejection filter having a center wavelength of 1.175 $\mu$m. The attenuation rate of a rejection band increases in proportion to the number of filters. Since the difference between nH and nL is set large, a satisfactory attenuation rate is obtained by using such a number of filters that is not more than a half of that of regular interference film filters. As may be understood from FIG. 28, the band width can be reduced arbitrarily by increasing m1, m2 when lL, lH are set.

Figure 29A:
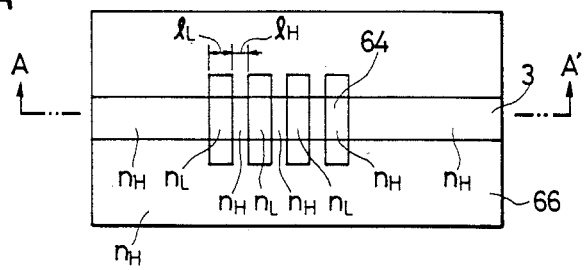
Figure 29B:
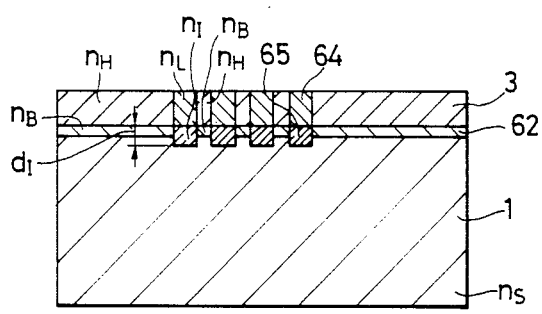
Figure 29C:
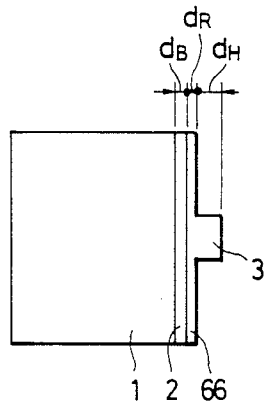

FIG. 29 shows a further embodiment of the optical filter according to the present invention. FIG. 29A is a top view, FIG. 29B a sectional view taken along the line A—A' in FIG. 29A, and FIG. 29C a side elevation. Among the reference numerals and letters in these drawings, the same numerals and letters as in FIG. 1 designate parts having the same functions. The embodiment of FIG. 29 having a waveguide of so-called rib-type construction, and is characterized in that slab portions 66 having a thickness dR are provided at both sides of a waveguide layer 3. Since this rib type waveguide is capable of lessening the manufacturing accuracy as compared with the rectangular waveguide of FIG. 25, it has a higher practicality. It is regarded that the waveguide shown in FIG. 25 is formed by reducing the thickness dR of the slab portions of the embodiment of FIG. 29 to zero. If the thickness dH of the slab portions 66 in the structure of FIG. 29 is reduced to zero, the structure is changed to a two-dimensional slab type waveguide structure.

Figure 30A:
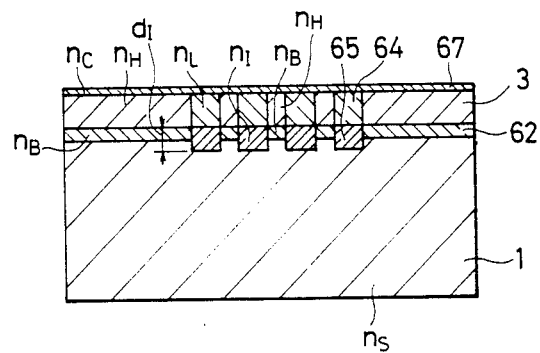
Figure 30B:
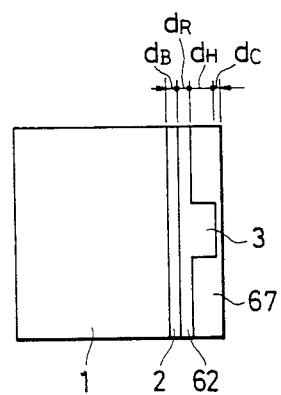

FIG. 30 shows a further embodiment of the optical filter according to the present invention, which is formed by providing a cover layer 67 on the structure of FIG. 29. In the structures of FIGS. 25 and 29, in which the waveguide layers are in direct contact with the outside air, a part of the light leaks to and propagates through the outside air, so that these structures are apt to be influenced by the disturbance. The cover layer 67 is provided for the purpose of preventing this inconvenience. This cover layer 67 also serves to prevent the material of the waveguide layer from being degenerated by an active gas in the air, such as oxygen. It is necessary that the refractive index nC of the cover layer 67 be set selectively to a level lower than those of nH and nL.

The greatest characteristics of the optical filter according to the present invention reside in that reflective parts 64, 65 having a large refractive index difference are provided. Owing to these characteristics, the filter can be formed of a small number of filter elements. This simultaneously means that it is possible that the radiation loss per reflective part becomes large. The greater part of the radiation loss of around 2–3 dB, which appears in the calculation values in FIGS. 27 and 28, consists of the radiation loss occurring on the discontinuous surface of the waveguide. In order to reduce the loss of the filter, it is necessary to minimize this radiation loss to as great an extent as possible. In order to minimize the radiation loss, it is necessary that the electromagnetic field distribution in a guided mode in the waveguide layer 3 and first cladding layer 62 and that in a guided mode in the reflective parts be matched. However, carrying out this matching operation on the basis of a thorough analysis of the electromagnetic fields is troublesome, and, moreover, does not necessarily give a clear solution. Therefore, parameters consisting of normalized frequencies of the waveguide are used, and a method of proximately carrying out the matching of the electromagnetic distribution of guided light by mating these parameters is employed. A normalized frequency V is a parameter obtained by the following equation and generally used to indicate the condition of the light guided in a waveguide.

$V = (nH^2(L) - nB^2(L))dH(L)k$ (wherein k is a free space wave number of the light)

Figure 31:
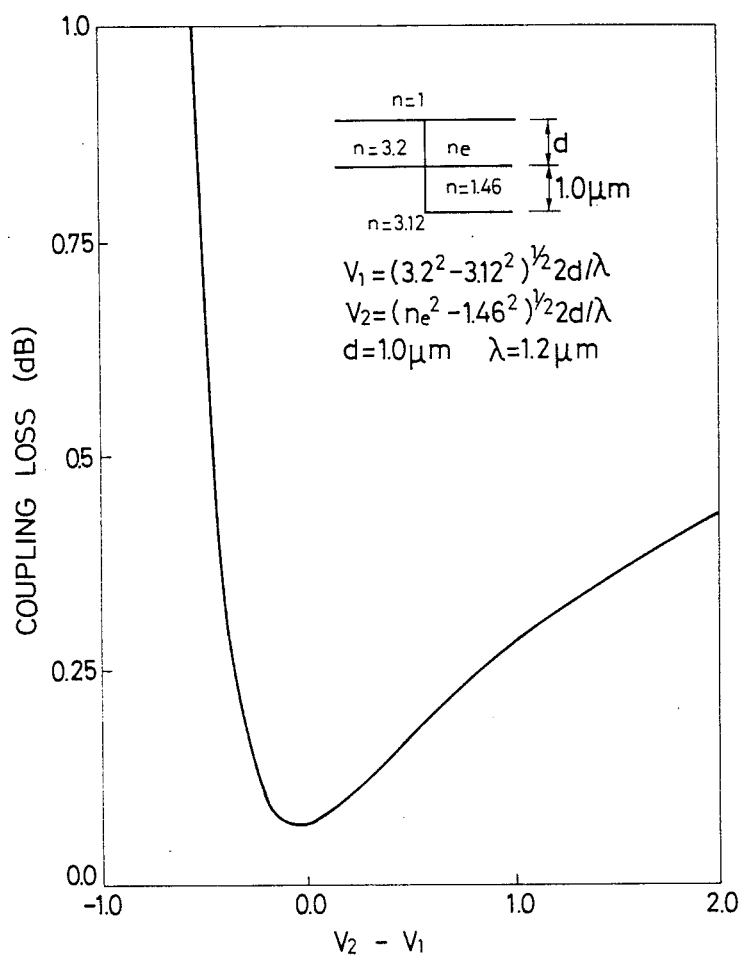
FIG. 31 is a diagram showing the coupling loss characteristics of a reflecting portion.
Figure 32A:
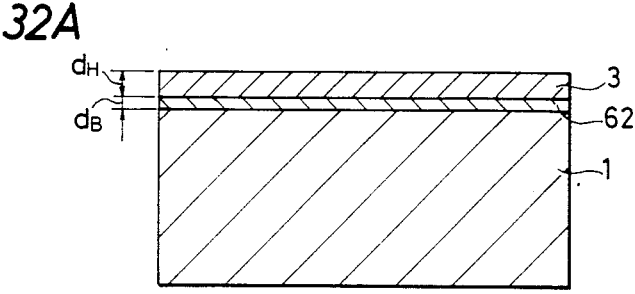
FIGS. 32A, 32B, 32C, 32D illustrate the steps of manufacturing the optical filter according to the present invention.
Figure 32B:
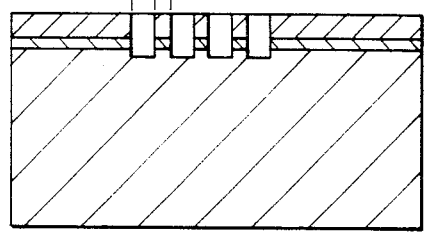
Figure 32C:
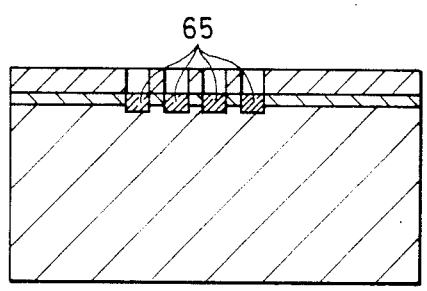
Figure 32D:
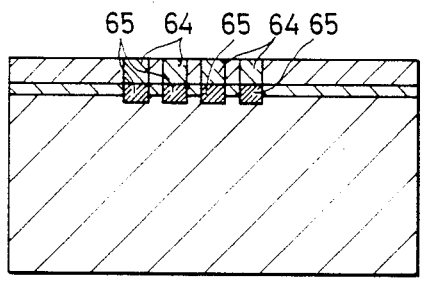

FIG. 31 is a graph in which a radiation loss per filter is taken in the direction of the longitudinal axis with a normalized frequency difference taken in the direction of the lateral axis. The graph shows that a point at which the normalized frequency difference becomes zero and a point at which the radiation loss becomes minimal substantially agree with each other, and it serves to ascertain that employing in this case a method using normalized frequencies is proper.

FIG. 32 shows an example of a process for manufacturing an optical filter. FIG. 32A shows a step of forming a first cladding layer 62 and a waveguide layer 3 on a substrate 1, and FIG. 32B a step of forming gaps in which reflective parts are to be packed, this packing operation being to be carried out by dry etching. If the thickness of each layer is determined so that the waveguide has a single mode, the depth of the gaps becomes around 2–3 $\mu$m. FIG. 32C shows a step of packing second cladding layers 65 in the gaps, and FIG. 32D a step of packing low-refractive-index layers 64 in the same gaps. Using CVD for this process is considered most suitable in view of the present state of development of the relative techniques.

Figure 33A:
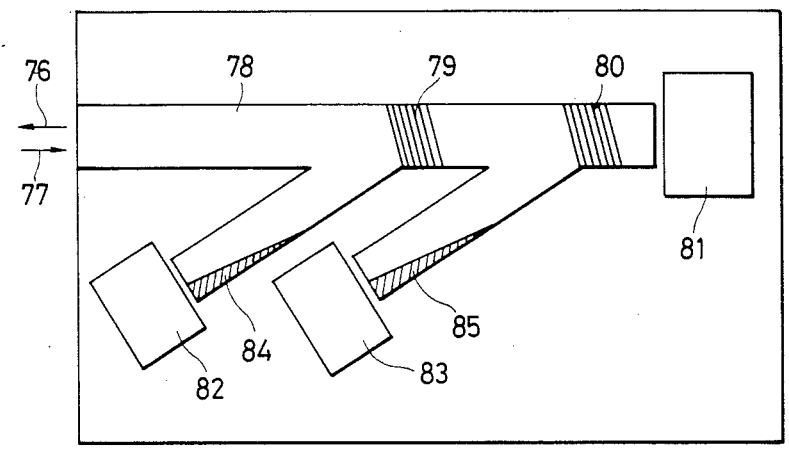
FIGS. 33A–33B show an embodiment of the multiplex wavelength transmission device.
Figure 33B:
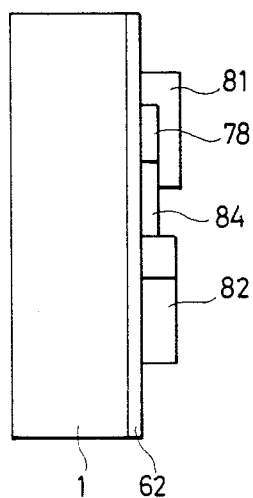

FIG. 33 shows an embodiment of the optical integrated circuit according to the present invention, which is a multiplex wavelength transmission device having a multiplexing number of three (receiving the light of 1.2 μm and 1.3 μm and emitting the light of 1.55 μm). Reference numeral 78 denotes a waveguide, and 79, 80 optical filters having rejection characteristics with respect to the bands having center wavelengths of 1.2 μm and 1.33 μm. These optical filters 79, 80 are provided at an angle to the waveguide, whereby the directions of advancement of incident, light and reflected light are separated to carry out the, dimultiplexing of wavelength. Accordingly, out of the rays of light entering the waveguide in the direction of an arrow 77, only the rays of light having a wavelength of 1.2 μm are reflected on the optical filter 79 and guided to a photo-detector 82. The rays of light having a wavelength of 1.3 μm passes through the optical filter 79 and are reflected on the optical filter 80 to be guided to a photo-detector 83. When the incident light includes rays of light of a wavelength other than 1.2 μm and 1.3 μm, these rays of light are guided to a light-emitting element 81, and do not reach the photo-detectors. The light of a wavelength of 1.55 μm from the light-emitting element 81 passes through the optical filters 79, 80 and advances outward in the direction of an arrow 76. A part of the light of a wavelength of 1.55 μm leaks at the branching portions of the waveguide toward the photo-detectors 82, 83 but this light turns into cut-off waves due to the influence of the low-refractive index portions 84, 85 provided in the waveguide, so that the light advances to the outside of the waveguide and does not reach the photo-detectors. The low-refractive-index portions 84, 85 are to be made by a method, such as the ion implantation. They can also be made collectively by the steps similar to those of manufacturing the optical filter. Referring to FIG. 33, the element 81 may consist of a photo-detector, and the elements 82, 83 light-emitting elements. The present invention is not limited to the above-described embodiments. For example, the layer of nH may be used as a low-refractive-index layer, and the layer of nL as a high-refractive-index layer. In this case, the refractive indexes are set selectively so that nH>nB; and nL>nI.

According to the present invention, a waveguide structure can be optimized so that the radiation loss in the film-packed portions thereof becomes minimal. Consequently, a wide-band optical film of a low radiation loss and a multiplex optical wavelength transmission device using this optical filter can be obtained. Owing to the achievement of the production of a one-chip module, the manufacturing cost can be reduced greatly, and the reliability of such filter and device can be improved greatly.

What is claimed is:

1. An optical filter comprising a cladding, an optical waveguide provided on said cladding, and at least one permeable material which is provided at an intermediate portion of said optical waveguide so as to extend in the light propagating direction, and which has a refractive index different from that of said waveguide, and a cover layer provided on an upper surface of said waveguide and said permeable material, wherein the width of said permeable material is set to about $$\frac{m}{4} \cdot \lambda 0,$$

wherein m is an odd number, and λ0 the wavelength of the light.

2. An optical filter according to claim 1, wherein said permeable material is provided plurality in a period of about $$\frac{m}{2} \cdot \lambda 0.$$

3. An optical filter comprising a cladding, an optical waveguide provided on said cladding, and at least one permeable material which is provided at an intermedaite portion of said optical waveguide so as to extend in the light prppagating direction, and which has a refractive index different from that of said waveguide, wherein said permeable material is provided so as to cover the upper surface of said optical waveguide.

4. An optical filter accoridng to claim 2, wherein at least one of said permeable materisals has a width of about $$\frac{m}{2} \cdot \lambda 0.$$

5. An optical filter according to claim 2, wherein at least one of said permeable materials has width of about $$\frac{3m}{4} \cdot \lambda 0.$$

6. An optical filter according to claim 2, wherein at least one of the portions of said waveguide which are sandwiched.

$$\frac{m}{2} \cdot \lambda 0.$$

7. An optical filter according to claim 2, wherein at least one of the portions of said waveguide which are sandwiched between said permeable materials has a width of about $$\frac{3m}{4} \cdot \lambda 0.$$

8. A method of manufacturing optical filters comprising the steps of forming a waveguide layer on a caldding layer, forming gaps in said waveguide layer by dry etching the same, forming a permeable oxide film in said gaps, and removing portions of said oxide film which are on said waveguide layer, by etching the same.

9. An optical device comprising an optical filter composed of a cIadding, an optical waveguide provided on said cladding, and at least one permeable material which is provided at an intermediate portion of said optical waveguide so as to extend in the light propating direction, and which has a refractive index different from that of said waveguide, a cover layer provided on an upper surface of said waveguide and said permeable material, and an optical element provided on at least one end of said optical waeguide, wherein the width of said permeable material is set to about $$\frac{m}{4} \cdot \lambda 0,$$

wherein m is an odd number; and λ0 the wavelength of the light.

10. An optical device according to claim 9, wherein said device further includes a lens provided between said optical element and said optical waveguide.

11. An optical filter comprising a cladding, an optical waveguide provided on said cladding, and at least one gap provided in an intermediate portion of said optical waveguide so as to extend in teh light propagating direction, wherein the width of said gap is set to substantially $$\frac{m1}{4nL} \cdot \lambda 0$$

is the wavelength of the light; nL a refractive index of said gap; and m1 an odd number, and said gap is provided plurally, said gaps having a cycle of substantially $$\frac{m1}{4nL} \cdot \lambda 0 + \frac{m2}{4nH} \cdot \lambda 0,$$

wherein nH is a refractive index of said waveguide; and m2 an odd number.

12. An optical filter according to claim 11, wherein at least one waveguide portion having a width of substantially $$\frac{m3}{2nL} \cdot \lambda 0,$$

wherein m3 is an odd number, is provided between adjacent

13. An opticasl filter according to claim 11, wherein at least one of the intervals betwene adjacent gaps is set to substantially $$\frac{m1}{4nL} \cdot \lambda 0 + \frac{m2}{2nH} \cdot \lambda 0,$$

wherein nH is a refractive index of said waveguide; m2 an odd number.

14. An optical fitler according to claim 11, wherein said gaps are provided therein with a permeable material the refractive index of which is different from that of said waveguide.

15. An optical filter comprising a first cladding, an optical waveguide provided on said first cladding, at least one second cladding which is provided on an intermediate portion of said first cladding so as to extend in the light propagating direction, and which has a refractive index different from that of said first cladding, and a permeable material provided between the upper surface of said second cladding and the lower surface of the corresponding portion of said optical waveguide and having a refractive index different from that of said optical waveguide.

16. An optical filter according to claim 15, wherein said optical waveguide is covered with a cover layer having a refractive index lower than that of said optical waveguide.

17. A method of manufacturing optical filters, comprising the steps of forming an optical waveguide layer on a first cladding layer, forming at least one gap in said first cladding layer and said optical waveguide layer, forming a second cladding layer, the refractive index of.which is different from that of said first cladding layer, in said gap, and providing a permeable material, the refractive index of which is different from that of said waveguide layer, on said second cladding layer.

* * * * *